(12) United States Patent
Karaki

(10) Patent No.: US 8,154,509 B2
(45) Date of Patent: Apr. 10, 2012

(54) ELECTRONIC DISPLAY SYSTEM, ELECTRONIC PAPER WRITING DEVICE, ELECTRONIC PAPER AND METHOD FOR MANUFACTURING THE SAME

(75) Inventor: Nobuo Karaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 139 days.

(21) Appl. No.: 11/882,523

(22) Filed: Aug. 2, 2007

(65) Prior Publication Data
US 2007/0285347 A1    Dec. 13, 2007

Related U.S. Application Data

(63) Continuation of application No. 11/195,750, filed on Aug. 3, 2005.

(30) Foreign Application Priority Data

Aug. 4, 2004 (JP) .................................. 2004-228316

(51) Int. Cl.
*G09G 3/34* (2006.01)

(52) U.S. Cl. ....... 345/107; 345/84; 345/204; 178/18.03; 178/45

(58) Field of Classification Search .................. 345/107, 345/55, 56, 87, 30, 211–213, 173–179; 709/203; 178/18.03–18.07, 19.03–19.07
See application file for complete search history.

(56) References Cited

U.S. PATENT DOCUMENTS

| | | | |
|---|---|---|---|
| 5,857,079 A | 1/1999 | Claus et al. | |
| 6,038,259 A | 3/2000 | Nanya | |
| 6,079,622 A * | 6/2000 | Goto | 235/492 |
| 6,176,433 B1 * | 1/2001 | Uesaka et al. | 235/492 |
| 6,194,993 B1 | 2/2001 | Hayashi et al. | |
| 6,427,065 B1 | 7/2002 | Suga et al. | |
| 6,545,671 B1 * | 4/2003 | Silverman | 345/179 |
| 6,700,567 B1 | 3/2004 | Jaeger et al. | |
| 6,737,884 B2 | 5/2004 | Shigemasa et al. | |
| 6,753,830 B2 * | 6/2004 | Gelbman | 345/55 |
| 6,774,884 B2 * | 8/2004 | Shimoda et al. | 345/107 |

(Continued)

FOREIGN PATENT DOCUMENTS

DE    196 10 507    9/1997

(Continued)

OTHER PUBLICATIONS

Feb. 2, 2010 Office Action issued in U.S. Appl. No. 11/195,750.

(Continued)

*Primary Examiner* — Quan-Zhen Wang
*Assistant Examiner* — Jennifer T Nguyen
(74) *Attorney, Agent, or Firm* — Oliff & Berridge PLC

(57) ABSTRACT

Aspects of the invention provide an electronic paper display system that can include an electronic paper and the writing device. The writing device transmits power and baseband signals by using an electromagnetic coupling between a coil of the writing device and a coil of the electronic paper. The baseband signals, which are encoded by the writing device, are decoded by a decoder of the electronic paper and fed to the control circuit to illustrate images on a bi-stable display unit. The electronic paper has a power storage that temporarily stores power transmitted by using electromagnetic coupling for absorbing fluctuation of power in both transmission and consumption. The asynchronous design of this invention brings both robustness and low-power consumption.

15 Claims, 9 Drawing Sheets

U.S. PATENT DOCUMENTS

| | | | |
|---|---|---|---|
| 6,906,495 B2 * | 6/2005 | Cheng et al. | 320/108 |
| 6,952,167 B2 | 10/2005 | Wakabayashi | |
| 7,006,083 B2 * | 2/2006 | Nishimura | 345/211 |
| 7,010,704 B2 * | 3/2006 | Yang et al. | 713/300 |
| 7,106,485 B2 * | 9/2006 | Hattori et al. | 359/237 |
| 7,181,179 B2 | 2/2007 | Fujisawa et al. | |
| 2005/0246621 A1 * | 11/2005 | Ogawa et al. | 715/500 |
| 2006/0017659 A1 | 1/2006 | Ogawa et al. | |
| 2006/0209055 A1 | 9/2006 | Wakita | |

FOREIGN PATENT DOCUMENTS

| | | |
|---|---|---|
| DE | 196 45 067 | 5/1998 |
| EP | 1 327 958 A1 | 7/2003 |
| JP | A-03-208158 | 9/1991 |
| JP | A-08-030752 | 2/1996 |
| JP | A-08-224331 | 9/1996 |
| JP | A-09-237293 | 9/1997 |
| JP | A-10-056377 | 2/1998 |
| JP | A-11-007427 | 1/1999 |
| JP | A-11-146580 | 5/1999 |
| JP | A-2001-053642 | 2/2001 |
| JP | A-2001-109407 | 4/2001 |
| JP | A-2001-312250 | 11/2001 |
| JP | A-2001-344578 | 12/2001 |
| JP | A-2002-169190 | 6/2002 |
| JP | A-2002-281423 | 9/2002 |
| JP | A-2002-350906 | 12/2002 |
| JP | A-2003-44176 | 2/2003 |
| JP | A-2003-216111 | 7/2003 |
| JP | A-2005-316672 | 11/2005 |
| TW | 516284 B | 1/2003 |
| WO | WO 99/10769 | 3/1999 |
| WO | WO 99/38117 | 7/1999 |
| WO | WO 2004/095406 | 11/2004 |

OTHER PUBLICATIONS

Oct. 23, 2009 Office Action issued in U.S. Appl. 11/195,750.

Japanese Office Action in Japanese Patent Application No. 2008-019383 dated Nov. 15, 2010 with English Translation.

Japanese Office Action in Japanese Patent Application No. 2007-298882 dated Nov. 12, 2010 with English Translation.

* cited by examiner

140
ELECTRONIC DISPLAY SYSTEM, ELECTRONIC PAPER WRITING DEVICE, ELECTRONIC PAPER AND METHOD FOR MANUFACTURING THE SAME

This is a Continuation of application Ser. No. 11/195,750 filed Aug. 3, 2005, which claims the benefit of Japanese Application No. 2004-228316 filed Aug. 4, 2004. The disclosures of the prior applications are hereby incorporated by reference herein in their entirety.

BACKGROUND

Aspects of the invention can relate to electronic papers, and particularly to an electronic paper system that consists of electronic papers and the writing device. The electronic paper wirelessly coupled onto the writing device consumes low power and provides excellent portability. Electronic papers in concept have received much attention as new display media that have advantage of both electronic displays and paper media. Electronic displays provide ease of refreshing with digital data and paper media provide portability, visibility or eye-friendliness and stability of document in print. Several configurations have been proposed for the electronic papers. For example, electrophoretic displays (EPD), electro-chromic displays (ECD), and twist-ball displays have been known.

In order for related art to display images on the electronic papers, as disclosed in Japanese Unexamined Patent Publication No. 2002-350906, a writing device is connected to a display, which forms an electronic paper, for rewriting images on the display with digital data supplied. Similar techniques have been disclosed in, for example, Japanese Unexamined Patent Publications No. 2002-169190 and No. 2001-312250.

In addition, Japanese Unexamined Patent Publication No. 2002-281423 discloses an image display sheet that is equipped with an antenna, receiving device and communication unit for rewriting images on the display with broadcasted digital information.

In related art, electronic papers, as disclosed in the above examples, however, need to be connected to the writing device in order to rewrite images lacking ease of use.

Also, the substantial weight and mass of power supply unit, which needs to be equipped in the related-art electronic papers, spoil the portability.

In the fourth example of related art, an electronic paper display does not need to be connected to an image information source since the electronic paper display is provided with a wireless receiver unit, which consumes so much power that the electronic paper needs to have a power supply unit connecting to a battery unit and or the ac outlet.

SUMMARY

An aspect of the invention can provide an electronic paper system that provide excellent portability by allowing the electronic paper, which has neither power supply unit connecting to the ac outlet nor battery unit, to refresh images based on data sent from the writing device. The electronic paper system, according to the first aspect of the invention, includes the writing device that transmits power and baseband signals of image information by using electromagnetic coupling between the writing device and the electronic paper, which operates to rewrite images by using the transmitted power and baseband signals of image information. The electronic paper unit consists of such bi-stable display device as EPD, ECD and twist-ball display. The electronic paper has a power storage that temporarily stores power transmitted by using electromagnetic coupling for absorbing fluctuation of power in both transmission and consumption.

According to the configuration, the exemplary writing device transmits image information and minimum power enough to operate the whole electronic paper. The electronic paper receives image information transmitted by using electromagnetic coupling for displaying images on the bi-stable display device, which features the electronic paper. Since the electronic paper is configured to obtain power by using electromagnetic coupling between the writing device and the electronic paper while displaying images on the bi-stable display device, and store the power in the power storage, and power can be supplied from the power storage, it needs no power supply unit, which connects to battery and or the ac outlet. Therefore, an electronic paper having excellent portability can be provided.

The electromagnetic coupling with optimal mutual inductance can be used for transmitting power and baseband signal, which is not modulated in frequency or phase but encoded by using say Manchester coding scheme that is used by Ethernet. However any other coding scheme can be adopted instead of Manchester coding. Since electromagnetic coupling with optimal mutual inductance is made by just placing a pair of coils close to each other, transmission of both power and information is easily achieved. Also, the term power storage encompasses all elements, devices and circuits that can store power for a certain period with any configuration. For example, a capacitor itself used in a smoothing circuit may be used as the power storage. Alternatively, a super capacitor may be provided separately, or a secondary or rechargeable battery may be used as the power storage.

The writing device of the first aspect may include a monitoring unit that is connected to an equivalent load corresponding to the load of the electronic paper for adjusting the power transmitted via the electromagnetic coupling by monitoring the power received by the equivalent-load receiving unit. According to the configuration, the writing device can include an equivalent-load receiving unit that receives electromagnetic waves transmitted by the writing device itself under the same load condition as that of the electronic paper, that is, under the similar condition as that of the electronic paper display device, and adjusts the output of electromagnetic waves based on the intensity of electromagnetic waves received by the equivalent-load receiving unit. Therefore, it is possible to supply electromagnetic waves that induce power having necessary and sufficient intensity that is not too large and is adequate to normally operate the electronic paper.

Although the term equivalent load encompasses a nearly same amount of load, any load is available as long as the correlation between the load monitored and the load of the electronic paper is known. For example, it is known in advance that the correlation between the load monitored and the load of the electronic paper can be proportional in ratio of 2:1.

An exemplary writing device according to a second aspect of the invention includes an encoding unit that encodes image information including information that corresponds to a certain image so as to generate an encoded signal with certain intensity, and an antenna unit including a coil that transmits the encoded signal as an electromagnetic wave. The antenna unit can be electromagnetically coupled to the antenna unit of an electronic paper to transmit the electromagnetic wave with optimal mutual inductance.

The exemplary writing device according to the second aspect may further include an antenna unit for monitoring that receives the electromagnetic wave transmitted from the antenna, and an equivalent load that has a load corresponding to the load of the electronic paper that receives the electromagnetic wave. The writing device may also include a monitoring unit that measures power consumed by the equivalent load, and an adjuster that adjusts intensity of the encoded signal from the encoding unit according to the relative value of the power measured by the monitoring unit.

According to the configuration, the writing device monitors power of the electromagnetic coupling by using an antenna for monitoring. The load coupled to the antenna for monitoring should be known in ratio to the load of the electronic paper. The monitoring unit or detector can output the relative value of power consumed by using the equivalent load proportional to the load of the electronic paper for the adjuster to adjust the power of electromagnetic coupling.

The encoding unit encodes image information either input from the outside or generated inside by using an input device attached. According to the configuration, a computer coupled onto the writing device by wire or radio can supply the image information. In addition, a typing input device coupled to the writing device can supply the image information composed of characters.

An exemplary electronic paper according to the third aspect of the invention can include an antenna that receives an electromagnetic wave, a decoding unit that decodes the encoded signal received by the antenna unit, a display control unit that controls to display the image information decoded by the decoding unit, a bi-stable display unit that displays, under the control by the display control unit, a power extraction unit that extracts power from the electromagnetic wave, and a power storage that stores power extracted by the power extraction unit.

According to the configuration, the power extraction unit extracts power from electromagnetic waves received by the antenna and store the power in the power storage. By using the power, the decoding unit decodes encoded signals, and the display control unit controls the bi-stable display unit for displaying the image information decoded. Therefore, a power supply device connected to either battery or the ac outlet for operating the electronic paper is not needed. Absence of the power supply device provides the electronic paper with excellent portability.

At least a couple of the display control unit and the decoding unit may preferably be made of asynchronous circuits. According to the configuration, since the circuits are not driven by global clocking while wasting power, the electronic paper of extremely low power consumption can be provided. Therefore, the electronic paper can be operated even by weaker power extracted from poor electromagnetic coupling. Also, a power storage can greatly be miniaturized because of extremely low power consumption and absence of clocking circuit. Furthermore, since a configuration for releasing heat is not required, the thickness of the electronic paper can be extremely reduced lowering the cost. In addition, the asynchronous circuit can be robust against deviation in switching delay, which originates deviations in characteristics of TFT devices, because the asynchronous circuits are self-timed. Moreover, thanks to absence of global clocking, electromagnetic emission from the asynchronous circuit is much less than that of synchronous circuits, and clock skew problems with larger wiring area disappear. All the circuits can be fabricated on a flexible substrate by using a poly-crystalline silicon TFT technology.

The fourth aspect of the invention relates to a manufacturing method adequate for manufacturing the above-described electronic paper display device. The manufacturing method can include forming a set of electrodes of a bi-stable display unit on a substrate, transferring a circuit part that includes a thin film semiconductor device formed in advance on another substrate on the substrate, and coupling a set of the output electrodes of the transferred circuit part onto the set of electrodes of the bi-stable display unit. The manufacturing method also includes forming partitions on the substrate to expose the one electrode, providing an electrophoretic dispersion liquid between the partitions formed on the substrate, and forming a common electrode to cover the partitions and the electrophoretic dispersion liquid provided between the partitions.

According to the method, since a thin film semiconductor device fabricated on a substrate is transferred to another substrate, a bi-stable display unit and the driver circuit can be separately fabricated and transferred onto plastic substrate avoiding thermal damages caused by higher-temperature processes. Therefore, the electronic paper including the thin film semiconductor device can be formed on a plastic substrate providing flexibility, for example. Also, low power consumption realized by using asynchronous circuits can get rid of a heat release structure maintaining the flexibility of plastic substrate.

BRIEF DESCRIPTION OF THE DRAWINGS

The invention will be described with reference to the accompanying drawings, wherein like numbers refer to like elements, and wherein.

DETAILED DESCRIPTION OF PREFERRED EMBODIMENTS

Exemplary embodiments of the invention will be described with reference to the drawings. The following exemplary embodiments relate to an electronic paper system having a writing device that transmits electromagnetic waves including certain image information, and an electronic paper display device that receives transmitted electromagnetic waves to display images corresponding to the image information on a non-volatile display unit. The embodiments of the invention described below are merely examples of the invention. The invention is not to limited to the following embodiments but can be applied with being modified variously.

Figure 1:
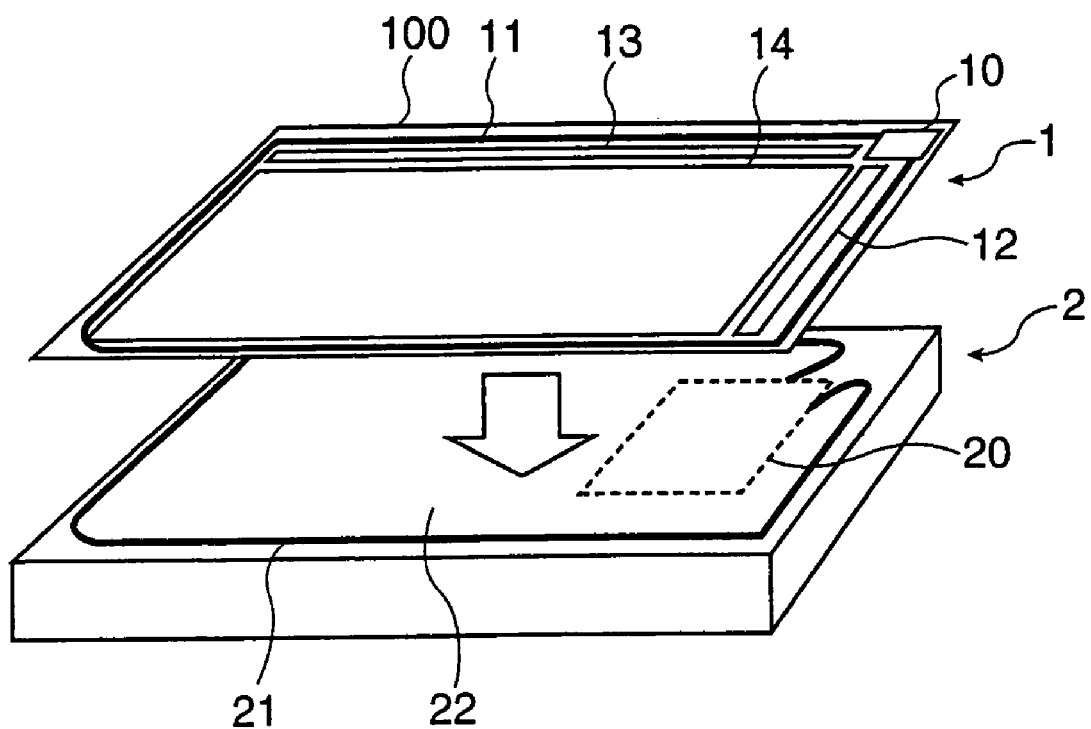
FIG. 1 is a schematic perspective view of an exemplary electronic paper system of a first embodiment.

FIG. 1 is a schematic perspective view of an electronic paper system according to a first exemplary embodiment of the invention. An electronic paper display device of the first embodiment can be operated with power obtained from received electromagnetic waves.

As shown in FIG. 1, the electronic paper system can include a writing device 2 that transmits electromagnetic waves including image information, and an electronic paper display device 1 that receives the transmitted electromagnetic waves to display images corresponding to the image information on a non-volatile display unit 14. The electronic paper display device 1 can include, on a substrate 100, an antenna unit 11 for receiving the electromagnetic waves, a control unit 10 that processes signals received by the antenna unit 11, the non-volatile display unit 14 that displays images based on image information output from the control unit 10, and driving circuits 12 and 13 for driving the non-volatile display unit 14, of the row (scan) and column (data) directions, respectively. The writing device 2 is provided with an antenna unit 21 on part of the surface of a main body 22, and incorporates a control unit 20.

Figure 2:
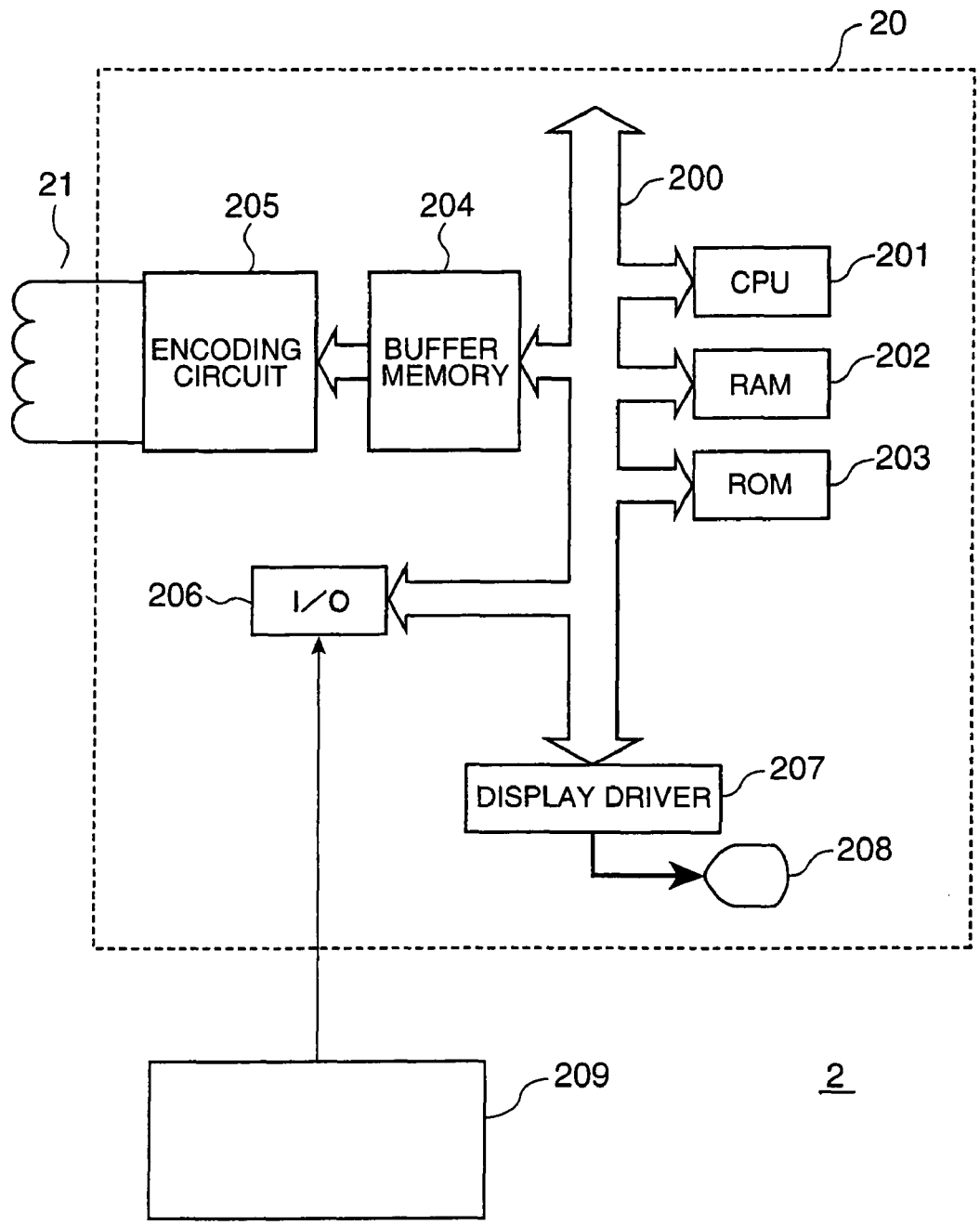
FIG. 2 is a block diagram of an exemplary writing device of the first embodiment.

FIG. 2 is an exemplary schematic block diagram of the writing device 2. The writing device 2 shown in FIG. 2 can include the antenna unit 21 and an encoding circuit (encoding unit) 205 as essential elements. The writing device 2 also includes, in the control unit 20, a CPU 201, a RAM 202, a ROM 203, a buffer memory 204, an interface circuit 206, a display driver 207 that are coupled to an internal bus 200, a display 208 and an input device 209, as control units for supplying image information to the encoding circuit 205.

The CPU 201 can be a central processing unit and executes a software program stored in the ROM 203, and thereby allowing the device to operate as the writing device of the first embodiment. The RAM 202 is utilized as a temporary work area for the CPU 201, and can store operation signals from the input device 209 and externally input data. The buffer memory 204 alleviates the difference of transmission rate between the control unit centered on the CPU 201 and the receiving unit including the encoding circuit 205 and the antenna unit 21, and thus functions to allow encoding and transmitting of data at a constant rate so that the data can be received and decoded at the electronic paper display device 1. If the buffer memory 204 is a first-in first-out (FIFO) memory, for example, data is read out at timing determined based on the control by the output regardless of timing when the data has been stored. Therefore, the computer device can store image information in the buffer memory 204 as soon as the image information becomes ready without considering the rate and timing of encoding. Thus, the buffer memory 204 of such a FIFO type is preferable as an interface of operation blocks having different rates and timings.

The interface circuit 206 transfers to the internal bus 200 operation signals resulting from the operation of the input device 209 that is a keyboard by a user. The operation signals from the input device 209 may be read by interrupt control for the CPU 201. The display driver 207 displays data to be displayed, by control by the CPU 201, on the display 208. The display driver 207 causes the display 208 to display the operation state of the writing device 2 and the content of operation signals input from the input device 209.

The encoding circuit 205 sequentially reads out data including image information from the buffer memory 204 so as to encode the data with a certain algorithm. For example, in the present embodiment, Manchester encoding is implemented as an encoding method that permits transmission of power and signals equal to or more than a certain level even if part of data is composed of continuous "1" or "0". The output of the encoding circuit 205 is adjusted so that electromagnetic waves with sufficient field intensity reach the antenna unit 11 of the electronic paper display device 1 when the electronic paper display device 1 approaches within a pre-assumed distance.

Manchester encoding is an encoding method at the time of serial transmission employed in Ethernet® and IEEE802.3. Manchester encoding employs clock signals of the duty rate of 50% as a base. Data is encoded as data "0" (CD0) if the front half is at an H level and the last half is at an L level, and is encoded as data "1" (CD1) if the front half is at an L level and the last half is at an H level. Clocks can be reproduced from the data sequence of the encoded codes. For example, a signal sequence [0, 1, 1, 0, 0, 0, 1, 0] is encoded into [01 10 10 01 01 10 01], and thus can be baseband transmitted without being modulated by carriers (carrier waves). In utilizing Manchester encoding, the encoding circuit 205 adds a preamble (for example, repetition of a signal sequence [0, 1], that is, repetition of an encoded signal [01 10]) to the front of the signal sequence so as to transmit the signal sequence. If a preamble is added in this manner, power extraction and power supply can be implemented in the electronic paper display device 1 prior to signal decoding. Thus, transmission and reception of power can be stabilized and output voltage can be stabilized. Also, Manchester encoding associates logical changes of 0 to 1 and 1 to 0 at the center of a signal pulse with data 0 and 1, respectively. Therefore, by adding a preamble, synchronization (position of the center of a signal pulse) of encoded signals transmitted from the writing device 2 can be comprehended prior to data decoding. In the encoding circuit 205 for Manchester encoding, specifically, digital data corresponding to image information is encoded in sync with clocks.

The baseband modulation frequency is near 13.56 MHz, which is defined by standard ISO/IEC14443 as the frequency for radio frequency identification (RFID) for wireless tags. If necessary, a lower baseband modulation frequency (for example, from 125 kHz to 134 kHz) can also be used. Using a lower modulation frequency band leads to advantages that the effect of external factors such as noises and water is small and that a relative long communication distance is possible. In the case of utilizing a relatively low baseband modulation frequency, the antenna unit 21 is formed in a loop wound a plurality of times. Such a configuration allows the antenna unit 21 to be electromagnetically coupled to the antenna unit 11 of the electronic paper display device 1, permitting electromagnetic waves to be transmitted by mutual induction.

Figure 3:
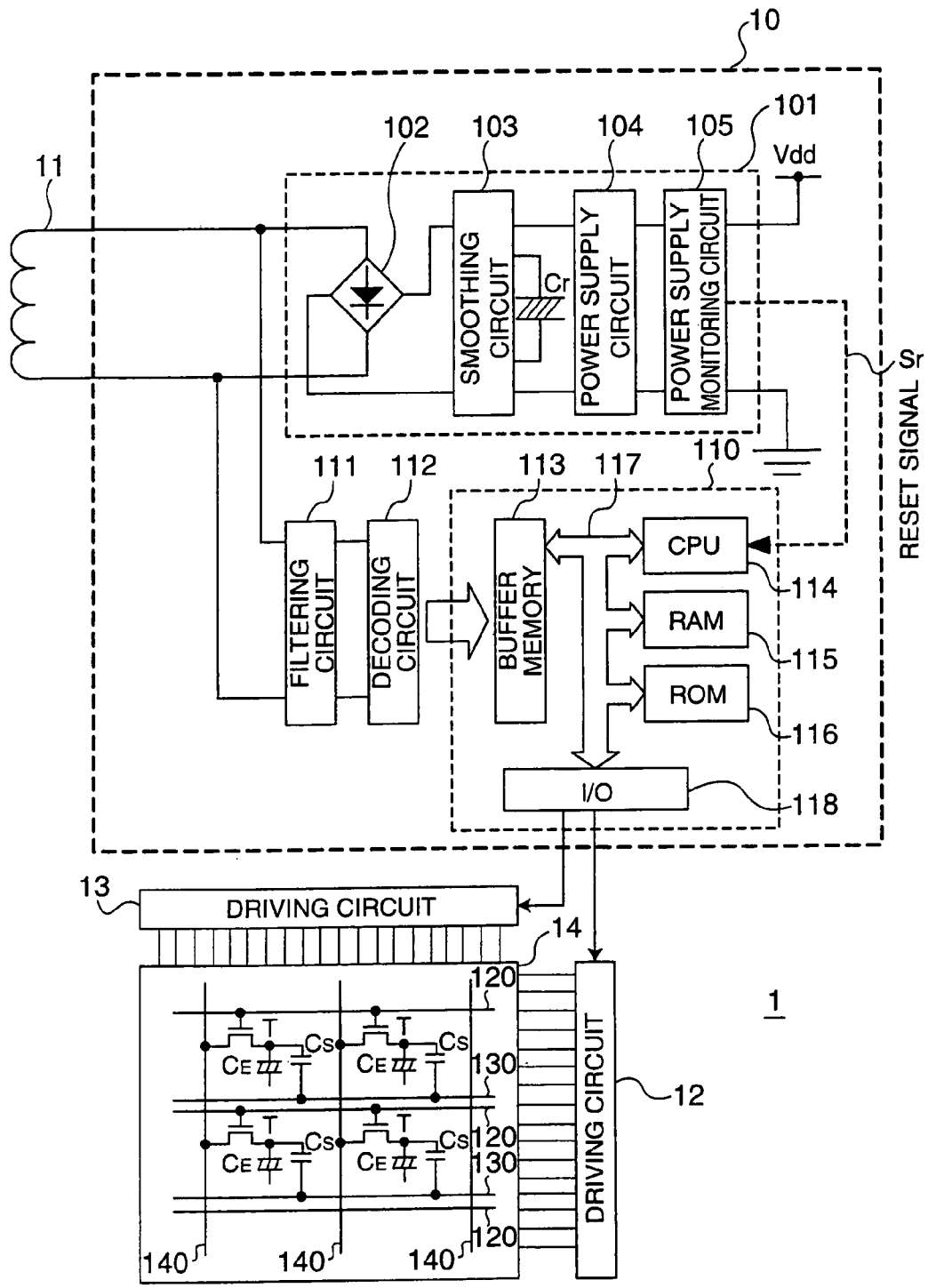
FIG. 3 is a block diagram of an exemplary electronic paper display device of the first embodiment.

FIG. 3 is an exemplary schematic block diagram of the electronic paper display device 1. The electronic paper display device 1 shown in FIG. 3 can include the control unit 10, the antenna unit 11, the driving circuits 12 and 13, and the non-volatile display unit 14. The control unit 10 includes a power extraction unit 101, a filtering Circuit 111, a decoding circuit (decoding unit) 112 and a display control unit 110. The power extraction unit 101 is provided with a power storage of the invention.

The antenna unit 11 is formed in a loop on the periphery of the electronic paper display device 1 as shown in FIG. 1, and has a form suitable for electromagnetic coupling to the antenna unit 21 of the writing device 2. The specific form is determined based on the interrelationship between the antenna unit 11 and the antenna unit 21 of the writing device 2. If the antenna unit 21 is wound in a loop a plurality of times, it is preferable that the antenna unit 11 is also wound a plurality of times similarly.

The exemplary electronic paper display device 1 of the invention is characterized in having, in addition to a system for processing encoded signals obtained by receiving electromagnetic waves, the power extraction unit 101 that extracts power from the received encoded signals and outputs the power to each part. Specifically, the power extraction unit 101 includes a rectifying circuit 102, a smoothing circuit 103, a power supply circuit 104 and a power supply monitoring circuit 105. The rectifying circuit 102 half-wave or full-wave rectifies an alternate current component. A publicly known half-wave or full-wave rectifying circuit can be applied to the rectifying circuit 102. The smoothing circuit 103 removes high frequency components and ripple components from signals rectified by the rectifying circuit 102 so as to turn the signals to a direct current, and includes a smoothing capacitor Cr, resistor or coil correspondingly to frequency components to be removed. The smoothing capacitor Cr corresponds to the power storage of the invention. Since the power consumption of the electronic paper display device 1 of the embodiment is extremely small, the smoothing capacitor Cr in the smoothing circuit 103 can also be used as a power storage. The capacitance of the capacitor Cr may be slightly larger than capacitance necessary to remove ripples. The power supply circuit 104 is a converter that lowers or boosts an output voltage from the smoothing circuit 103 to a voltage that can be utilized in the display control unit 110, and may be omitted if there is no need to adjust voltages. The output voltage from the power supply circuit 104 is supplied to the display control unit 110 and so on as an operation power supply Vdd of the electronic paper display device 1. The power supply monitoring circuit 105 detects a voltage (or current) of the power supply Vdd output from the power supply circuit 104, and continues to output a reset signal Sr to the display control unit 110 including a CPU 114 until the output power supply voltage (current) reaches a value within a certain allowable range. The reset signal Sr is deactivated when the power supply voltage (current) reaches a value within the allowable range. When the reset signal Sr is deactivated, the CPU 114 operates an address counter for reading out program data from a specific address of a ROM 116. In such a configuration, display control is implemented only at a power supply state in which malfunction of the computer device is not caused. Therefore, unexpected displaying due to runaway or malfunction of the computer device can be avoided.

Electromagnetic waves received by the antenna unit 11 are processed as encoded signals in a signal processing system. The filtering circuit 111 coupled to the antenna unit 11 can remove unnecessary frequency components included in the received encoded signals (received signals). If such frequency components are not included in encoded signals, or if included frequency components have no effect on the operation of the decoding circuit 112, there is no need to provide a filtering circuit. The decoding circuit 112 decodes encoded signals to generate data including image information. Specifically, the decoding circuit 112 has a PLL circuit part and a decoder circuit part. The PLL circuit part generates clocks synchronized with the centers of the encoded signals by a preamble included in the encoded signals. The decoder circuit part detects the transition state of logic of the encoded signals, which is original information part, in sync with the clocks so as to decode the encoded signals into corresponding signals.

The display control unit 110 includes a buffer memory 113, the CPU 114, the RAM 115, a ROM 116, an internal bus 117 and an interface circuit 118. The buffer memory 113 sequentially stores decoded data transmitted from the decoding circuit 112 one after another and alleviates the difference of processing rate from the control device centered on the CPU 114. For example, a FIFO memory is preferable as such a memory. If the FIFO memory is used, since data is read out at timing determined based on control by the output regardless of timing when the data has been stored, data can be read as needed when the data becomes readable in the computer device, preventing the overflow of the memory. The CPU 114 is a central processing unit and executes a software program stored in the ROM 116, and thereby allowing the device to operate as the electronic paper display device of the first embodiment. The RAM 115 is utilized as a temporary work area for the CPU 114.

The display control unit 110 centered on the CPU 114 may have a function of checking whether or not received encoded signals include data errors, and a function of correcting the errors. In order to implement such error check and correction (ECC) functions, in the encoding circuit 205 or control device centered on the CPU 201 in the writing device 2, hamming codes of a certain standard are added as redundant bits, and main data together with the redundant bits are encoded and transmitted. The display control unit 110 in the receiving unit detects bit errors generated in the decoded data and corrects the errors if bit errors are detected. The number of bits that can be detected and corrected is determined depending on hamming codes to be used. For example, the display control unit 110 may be provided with a function of detecting bit errors up to two bits and a function of correcting bit errors of one bit. Such ECC functions may be provided to the decoding circuit, or may be implemented by the display control unit 110 by software processing. The interface circuit 118 divides image information whose errors have been corrected by the above-described functions into scan (row) signals and data (column) signals so as to separately output the signals to the driving circuits 12 and 13, respectively.

The non-volatile display unit 14 can include a plurality of pixels arranged in a matrix. Each pixel has an electrophoretic element $C_E$, a thin film transistor (TFT) T for driving the electrophoretic element $C_E$ and a capacitance element $C_S$ for holding the electrical polarization state of a dispersion liquid in the electrophoretic element. In FIG. 3, the capacitance $C_E$ indicates a capacitance equivalent to that of the electrophoretic element. The source of the thin film transistor T is coupled to a data line 140, while the gate thereof is coupled to a scan line 120. Also, the drain thereof is coupled to one electrode (individual electrode 320) of the electrophoretic element and one electrode of the capacitance element $C_S$. A certain voltage (for example, the intermediate value of a voltage variation range of the individual electrode 320) is applied to the other electrode of the electrophoretic element as a common electrode. The other electrode of the capacitance element $C_S$ is coupled to a ground potential line 130 supplying a ground potential.

In such a pixel circuit arrangement, the selection state of the scan lines 120 and the data lines 140 is varied to change the polarization state in the electrophoretic element into one of two states. Thereby, visually different brightness and colors are displayed (to be described later).

Figure 4A:
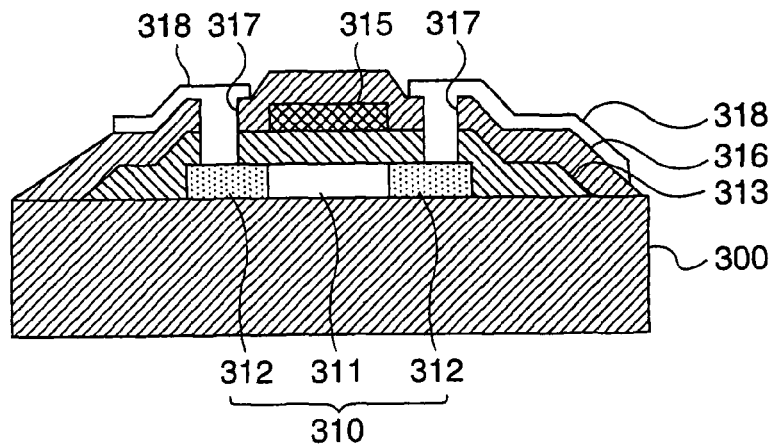
FIG. 4A is an enlarged sectional view of a semiconductor device used in a non-volatile display unit of the exemplary embodiment.

FIG. 4A shows a sectional structure of each thin film transistor T. The thin film transistor T is formed or transferred on a substrate 300 (corresponding to the substrate 100 of FIG. 1).

The thin film transistor T can include a semiconductor film 310 that has a channel region 311 and source and drain regions 312, a gate insulating film 313, a gate electrode 315, an interlayer insulating film 316 and an electrode layer 318. In the thin film transistor T, the electrode layer 318 is coupled to the source and drain regions 312 via through holes 317 formed in the interlayer insulating film 316 and the gate insulating film 313, and thereby source and drain electrodes are formed. In the present embodiment, the thin film transistor T is formed on a high temperature resistant substrate such as a glass substrate, and then is transferred onto the substrate 300.

Figure 4B:
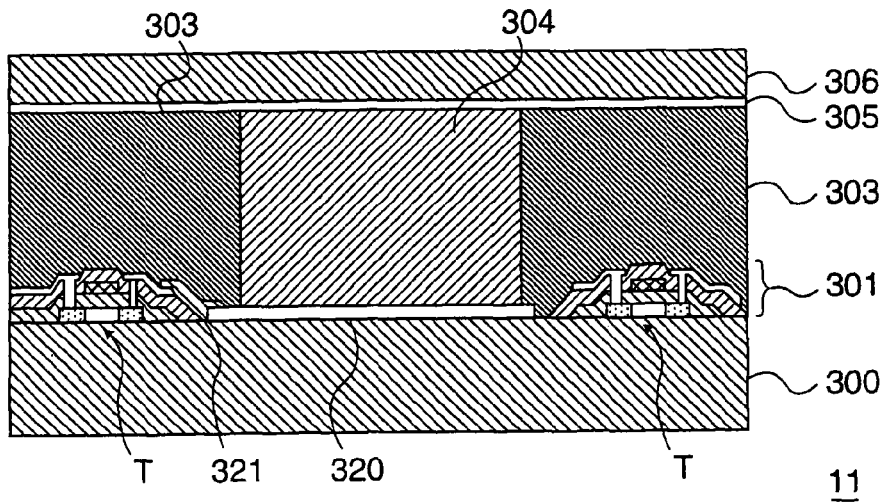
FIG. 4B is an enlarged sectional view of part of the non-volatile display unit of the exemplary embodiment.

FIG. 4B is an enlarged sectional view showing the structure around one pixel of the non-volatile display unit 14. As shown in FIG. 4B, for each pixel, the thin film transistor T and the individual electrode 320 composed of a transparent electrode material such as ITO are provided on the substrate 300, and the output terminal of the thin film transistor T is electrically coupled to the individual electrode 320 serving as a partition by a wiring layer 321. A resin layer 303 is provided to surround the individual electrode 320. A space on the individual electrode 320 surrounded by the resin layer 303 is filled with an electrophoretic dispersion liquid layer 304. A common electrode 305 composed of ITO or the like is provided to cover the electrophoretic dispersion liquid layer 304 and the resin layer 303. A protective film 306 made of a PET film or the like is formed on the common electrode 305. The electrophoretic dispersion liquid layer 304 includes a dispersion medium and electrophoretic particles 319 dispersed in the dispersion medium. The electrophoretic particles 319 and the dispersion medium are colored in different colors. For example, fine particles of titanium dioxide are used as the electrophoretic particles 319. A substance prepared by adding a dye, a surfactant and an additive agent, such as a charge-providing agent to an isoparaffin solvent, can be used as the dispersion medium in order to ensure contrast against the color of the fine particles.

The operation of the electrophoretic element will be described with reference to FIGS. 5A to 5C. Here it is assumed that a viewer of the electronic paper display device 1 views the display from the upper side of the drawing (through the protective film 306). In the electrophoretic dispersion liquid layer 304, two types of polarization states are caused depending on the direction of an electric field applied between the individual electrode 320 and the common electrode 305.

Figure 5A:
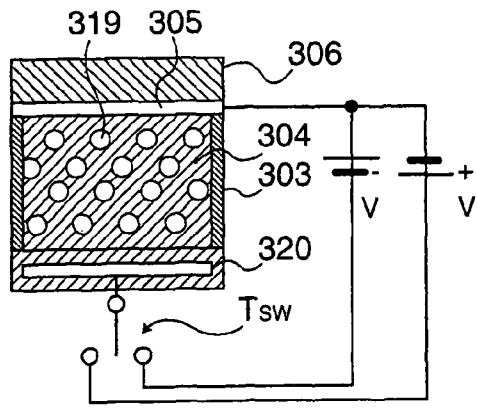
FIG. 5A is an explanatory diagram of the operation of the non-volatile display unit of the exemplary embodiment when no voltage is applied.
Figure 5B:
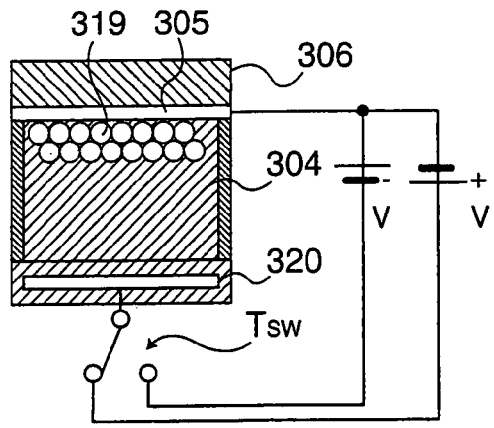
FIG. 5B is an explanatory diagram of the operation of the non-volatile display unit of the exemplary embodiment when a positive voltage is applied to an individual electrode of the non-volatile display unit.
Figure 5C:
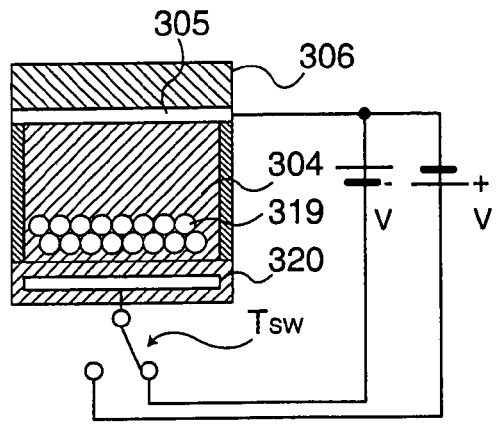
FIG. 5C is an explanatory diagram of the operation of the non-volatile display unit of the embodiment when a negative voltage is applied to the individual electrode of the non-volatile display unit.

Referring to FIG. 5A, no voltage is applied to the individual electrode 320. Therefore, no electric field is generated between the individual electrode 320 and the common electrode 305, causing no movement of the electrophoretic particles 319. Referring next to FIG. 5B, when a switch TSW implemented by the thin film transistor T is operated to apply a certain positive voltage +V to the individual electrode 320 with respect to the common electrode 305, the electrophoretic particles 319 collect near the common electrode 305. Thus, a viewer viewing the display through the protective film 306 recognizes the color of the electrophoretic particles 319 (for example, white). In contrast, referring to FIG. 5C, when the polarity of the switch TSW by the thin film transistor T is inverted to apply a certain negative voltage −V to the individual electrode 320 with respect to the common electrode 305, the electrophoretic particles 319 collect near the individual electrode 320, being remote from a viewer. Thus, the viewer mainly recognizes the color of the dispersion medium (for example, black). If the voltage of the common electrode 305 is set to the intermediate value of two voltage values (+V and −V) that are supplied to the individual electrode 320 in accordance with a bit logic state, the polarity state of each electrophoretic element, that is, the color displayed at each pixel can be changed only by varying a voltage supplied to the individual electrode 320 in accordance with bit logic.

As described above, by inverting the polarization direction of the electrophoretic dispersion liquid layer 304 by the thin film transistor T, the color displayed at pixels can be set to either white or black. If the whole pixels of the non-volatile display unit 14 arranged in a matrix are controlled while associating color control of each pixel with a bit logic state of image information, a certain image corresponding to the image information can be displayed visually.

The data determining the polarization state of each pixel is serial data from the display control unit 110, supplied from the driving circuits 12 and 13 and determining the logic state of the scan lines 120 and the data lines 140.

The driving circuit 12 incorporates a shift register that can output data for the number of scan lines 120, and thus can reflect the bit logic state of data serial-output from the display control unit 110 as the selection state of the scan lines 120. The driving circuit 13 also incorporates a shift register that can output data for the number of data lines 140, and thus can reflect the bit logic state of serially output data as the selection state of the data lines 140.

The display control unit 110 may include a compensation circuit for canceling an after-image phenomenon of each electrophoretic element of the non-volatile display unit 14. The compensation circuit carries out such data writing that the electrophoretic elements completely become either of polarization states (completely display white or black) before displaying of a certain grayscale, for example.

Also, in the above-described circuit, it is preferable that the decoding circuit 112, the display control unit 110, and/or the driving circuits 12 and 13 are formed of asynchronous circuits. The asynchronous circuit is an event driven circuit, and is designed to asynchronously operate in response to the changes of signals from the external. An asynchronous CPU, which is the heart of the asynchronous circuit, has the same block configuration as that of a synchronous computer basically: for example, a program counter, a memory address register that stores the address of a command to be executed next, a memory data register that holds data read from a memory to be accessed, a command register holding a command under execution, a general register that is a work area necessary for computation and processing, an arithmetic circuit, and a circuit for controlling the whole circuit. In the asynchronous CPU, however, each block is not operated by basic clocks. Therefore, circuits for adjusting the operation are needed.

A rendezvous circuit and an arbitration circuit take the adjustment role. These circuits locally cooperate with each other as a special circuit that define the operation order of the blocks so that when processing by one block has completed and all data become ready, processing by the next block starts. Specifically, the rendezvous circuit implements control with a pipeline method to coordinate the operation of the asynchronous CPU and flow data in order even if clocks for central control are absent. For example, a Muller-C element is used as the rendezvous circuit. The arbitration circuit implements arbitration processing for prioritizing either one processing of processing by two blocks if the two blocks are to access a certain block almost simultaneously. Various publicly-known techniques that have long been researched are available for the asynchronous CPU. For example, the outline of the asynchronous CPU is disclosed in "Hidouki-chip de genkai wo yabure" I. E. Sutherland et al., Nikkei Science 2002 November issue, p. 68-76 which is incorporated herein by reference in its entirety. It is preferable that not only the CPU 114 but also the RAM 115, the ROM 116, the buffer memory 113, the interface circuit 118, the decoding circuit 112, and the driving circuits 12 and 13 operate asynchronously.

If the asynchronous circuit is used, a current flows and power is consumed only at the moment when the operation is required. Therefore, a system of extremely low power consumption can be provided, and is preferable for a circuit configuration of an electronic paper display device of the invention using electromagnetic waves as a power source. Also, in the asynchronous circuit, clock skew, which is a problem of a clock system, does no exist since global clocks (reference clocks) are not used. Thus, the performance of the whole circuit is not deteriorated even in a device in which circuits are mounted in a large area like an electronic paper. In addition, the problem of critical path, which is problematic in design of a synchronous circuit, is not caused, and thus complicated design to operate the circuit even at the worst condition is not required. For example, for a conventional synchronous circuit, the rated operating frequency is defined while taking into consideration a rated operating temperature range, rated operating voltage range, variation among elements, variation among chips, and so forth. However, using an asynchronous circuit like the present embodiment eliminates the need of these considerations in principle. Also, a power storage can greatly be miniaturized since power consumption is low, and the number of parts for an oscillation circuit is reduced since no clock is needed, resulting in a smaller thickness of the electronic paper display device 1. Furthermore, since power consumption is low and thus a configuration for heat release is not required, the thickness of the electronic paper display device 1 can further be reduced. The power storage and other parts can be miniaturized or omitted, leading to lower costs. In addition, the asynchronous circuit is robust against variation of element characteristics, improving the manufacturing yield. Moreover, the asynchronous circuit does not require measures against second harmonic waves of clocks, and therefore the operation speed of the circuit can be enhanced to the maximum even when an element whose operation speed is relatively low, such as a thin film element, is used or large wire delay exists. Since the circuit can be fabricated by using thin film semiconductor devices, stable circuits can be fabricated on a flexible substrate by using a poly-silicon thin film semiconductor manufacturing technique that employs low-temperature poly-silicon or high-temperature poly-silicon.

Although electrophoretic elements are applied to the non-volatile display unit 14 in the embodiment, the invention can be applied without being limited to the embodiment. For example, a twist-ball display (TBD) may be used, or a display may be used in which a conductive toner and insulating particles having different colors are interposed between two multi-layer substrates of an electrode and charge transport layer, and the direction of an electric field applied to both substrates is controlled to move the conductive toner so as to display images. Also, a non-volatile display unit is also available employing a guest-host type compound film of liquid crystal and polymer, including smectic liquid crystal and a dichroic dye. In this display part, the dichroic dye and liquid crystal are aligned by heating to obtain a focal conic state, and thereby increasing optical absorption to display a color. In the case of achromatizing, an electric field is applied to the display part displaying the color to change the state from a focal conic state to a homeotropic state.

In the above-described configuration of the exemplary embodiment, when the input device 209 of the writing device 2 is operated, operation signals corresponding to the operation are input to the control unit 20 via the interface circuit 206. The control unit 20 generates image information for displaying character codes associated with the operation signals for example, and generates redundant bits for detecting and correcting errors so as to store the image information and redundant bits in the buffer memory 204. The encoding circuit 205 reads out, at adequate timing for encoding, data including the image information from the buffer memory 204 in the order in which the data has been stored so as to implement Manchester encoding. Then, the encoding circuit 205 modulates the codes at a baseband modulation frequency to output the codes from the antenna unit 21 as electromagnetic waves. Transmission of the electromagnetic waves may repeatedly be continued for a certain period without pauses. Alternatively, the same data may repeatedly be transmitted with certain intervals. In the case where operation signals are continuously input from the input device 209, the same data may be transmitted only one time (or a certain number of times) in each case.

When a user wants to display an image on the electronic paper, the electronic paper display device 1 is brought close to the writing device 2. When the antenna unit 21 approaches the antenna unit 11 to the extent that electromagnetic coupling therebetween becomes possible, it becomes possible to decode the encoded signals at the electronic paper display device 1. If the intensity of the electromagnetic waves becomes sufficiently high to obtain sufficient electric energy, that is, a power supply Vdd from the power extraction unit 101, the power supply monitoring circuit 105 that monitors the power supply state deactivates the reset signal Sr. In the display control unit 110, as soon as the CPU 114 starts operation from the initial state and becomes a ready state, it becomes possible to read out data including decoded image information from the buffer memory 113.

The encoded signals received by the antenna unit 11 are input to the decoding circuit 112 via the filtering circuit 111 and are decoded into the image information including redundant bits. The data is sequentially retrieved by the CPU 114 via the buffer memory 113. The CPU 114 executes computation of hamming codes including the redundant bits to detect and correct bit errors. Even if bit errors are generated in the transmitted data during the process of transmission or reception, the display control unit 110 can detect and correct the bit errors.

The image information for which error detection and correction has been completed is sorted to the driving circuits 12 and 13 via the interface circuit 118 in accordance with the pixel positions, so as to be reflected as the selection state of the scan lines 120 or the data lines 140. In each pixel of the non-volatile display unit 14, the thin film transistor T supplies a voltage corresponding to the selection state of respective scan lines 120 and data lines 140 to the individual electrode 320 of each electrophoretic element $C_E$. In each pixel, the voltage applied to the individual electrode 320 of the electrophoretic element changes correspondingly to the bit logic state of data, and therefore white or block can be displayed correspondingly to the bit logic state of "1" or "0" of pixel information. The assemblage of white or black state of the pixels is viewed by a user as characters or graphics.

As described above, according to the first embodiment, the electronic paper display device 1 can be provided with the power extraction unit 101 so that power is extracted from electromagnetic waves so as to be stored in the smoothing capacitor Cr that is a power storage. Therefore, individual power supply units for operating the electronic paper display device are not needed, and thus an electronic paper display device having excellent portability can be provided.

In addition, according to the first exemplary embodiment, a power supply monitoring circuit that monitors the power supply state of extracted power is provided, and the display control unit 110 is operated only when the supplied voltage is within a certain allowable range. Thus, malfunction and display error can be prevented or reduced.

Furthermore, according to the first exemplary embodiment, using an asynchronous circuit enables an electronic paper display device of extremely low power consumption to be provided. Therefore, the electronic paper display device can be operated fully even if received electromagnetic waves are weak and thus extracted power is small.

A second exemplary embodiment of the invention can relate to an writing device that receives electromagnetic waves transmitted from the writing device itself to adjust transmission output.

Figure 6:
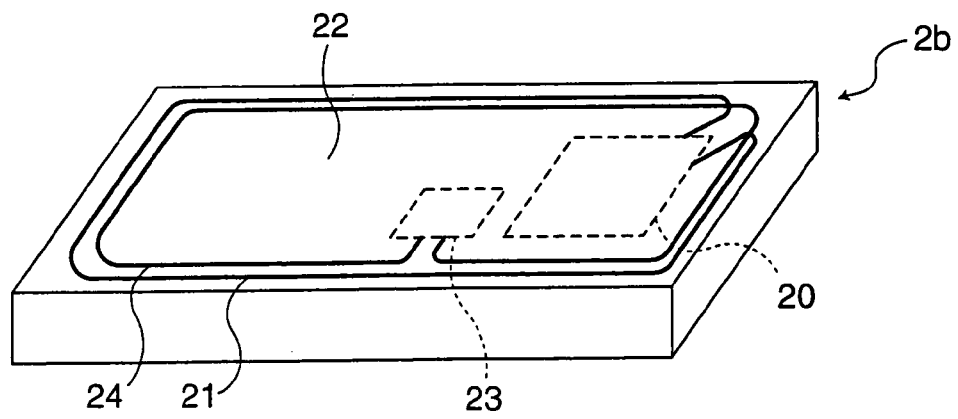
FIG. 6 is a schematic perspective view of an electronic paper system of a second exemplary embodiment.

FIG. 6 is a schematic perspective view of an writing device 2b of the second exemplary embodiment. The writing device 2b of the second exemplary embodiment is the same as the first exemplary embodiment in that the main body 22 includes the control unit 20 and the antenna unit 21, and is different from that in that an equivalent load receiving unit 23 and an antenna unit 24 for monitoring are further provided.

Figure 7:
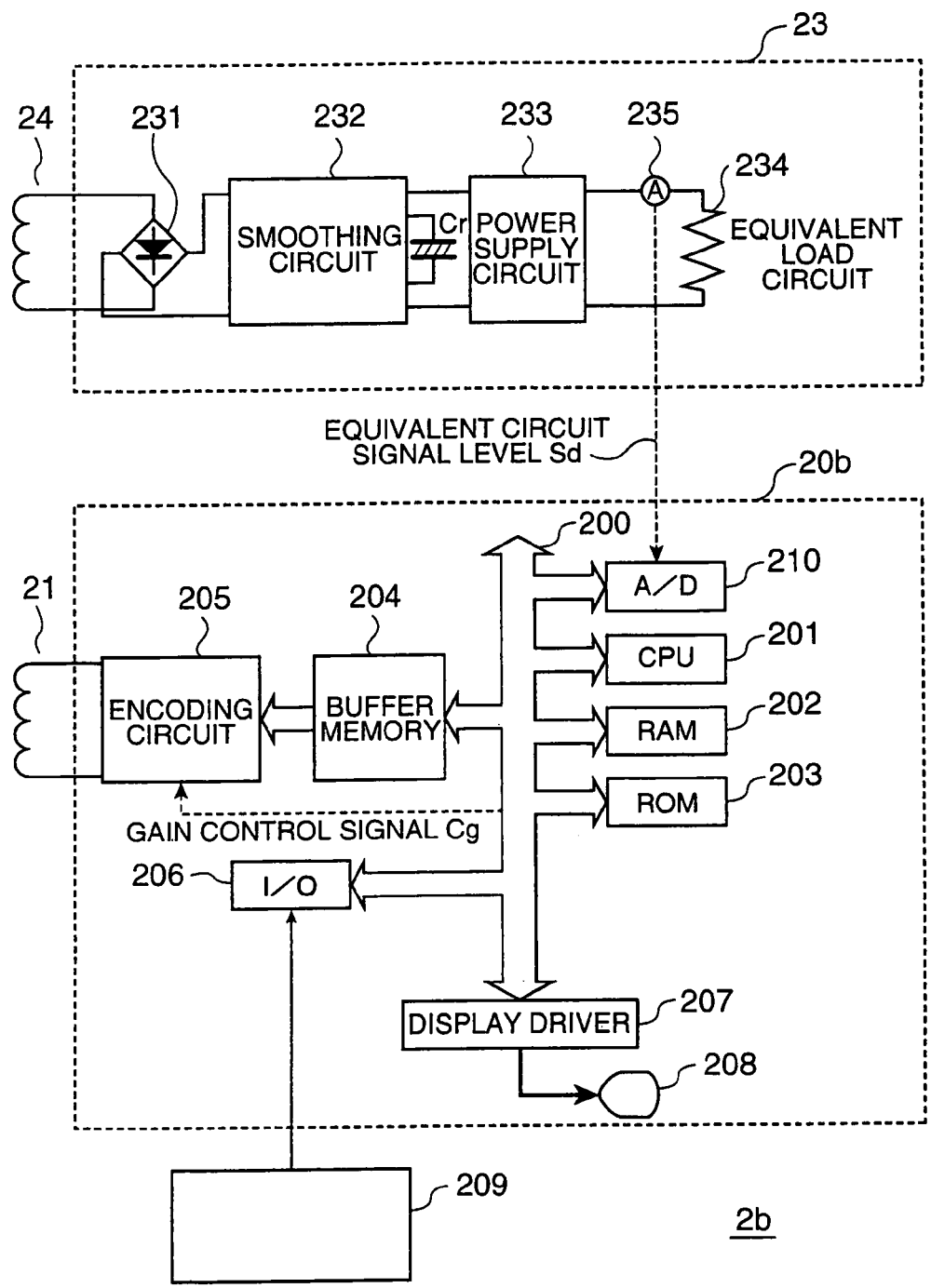
FIG. 7 is a block diagram of a writing device of the second exemplary embodiment.

FIG. 7 is a schematic block diagram of the writing device 2b of the second exemplary embodiment. The equivalent load receiving unit 23 includes the antenna unit 24 for monitoring, a rectifying circuit 231, a smoothing circuit 232, a power supply circuit 233, an equivalent load circuit 234 and a detector 235.

As shown in FIG. 6, the antenna unit 24 for monitoring is provided near the antenna unit 21 for transmission. The distance (positional relationship) between the antenna unit 24 for monitoring and the antenna unit 21 for transmission is such that the antenna unit 24 for monitoring can obtain field intensity equal to the field intensity obtained at the antenna unit 11 of the electronic paper display device 1 that is at an adequate position. The antenna unit 24 for monitoring is provided to receive electromagnetic waves transmitted from the antenna unit 21 for transmission. The rectifying circuit 231, the smoothing circuit 232 and the power supply circuit 233 are almost equal to the rectifying circuit 102, the smoothing circuit 103 and the power supply circuit 104 of the electronic paper display device 1, and have similar functions. The equivalent load circuit 234 has the almost same load as the load of the electronic paper display device 1 with respect to the power supply circuit 104, and thus consumes the same power as the electronic paper display device 1. The equivalent load circuit 234 is set to have the same load condition as that of the electronic paper display device 1 by combining, for example, resistors, capacitors and inductors. However, the equivalent load condition is not necessarily needed as long as a certain relationship (for example, proportional relationship) between the loads is known in advance. The detector 235 detects the relative value (effective value) of power (current) consumed by the equivalent load circuit 234 so as to output the value as an equivalent circuit signal level Sd.

A control unit 20b of the writing device 2b is provided with an A/D conversion circuit 210 to input the equivalent circuit signal level Sd detected by the detector 235 as digital data. Other configurations of the control unit 20b are the same as the control unit 20 of the first embodiment. A software program stored in the ROM 203 enables the CPU (adjuster) 201 to implement power transmission adjustment processing of FIG. 8, and to execute power transmission adjustment of the invention.

Figure 8:
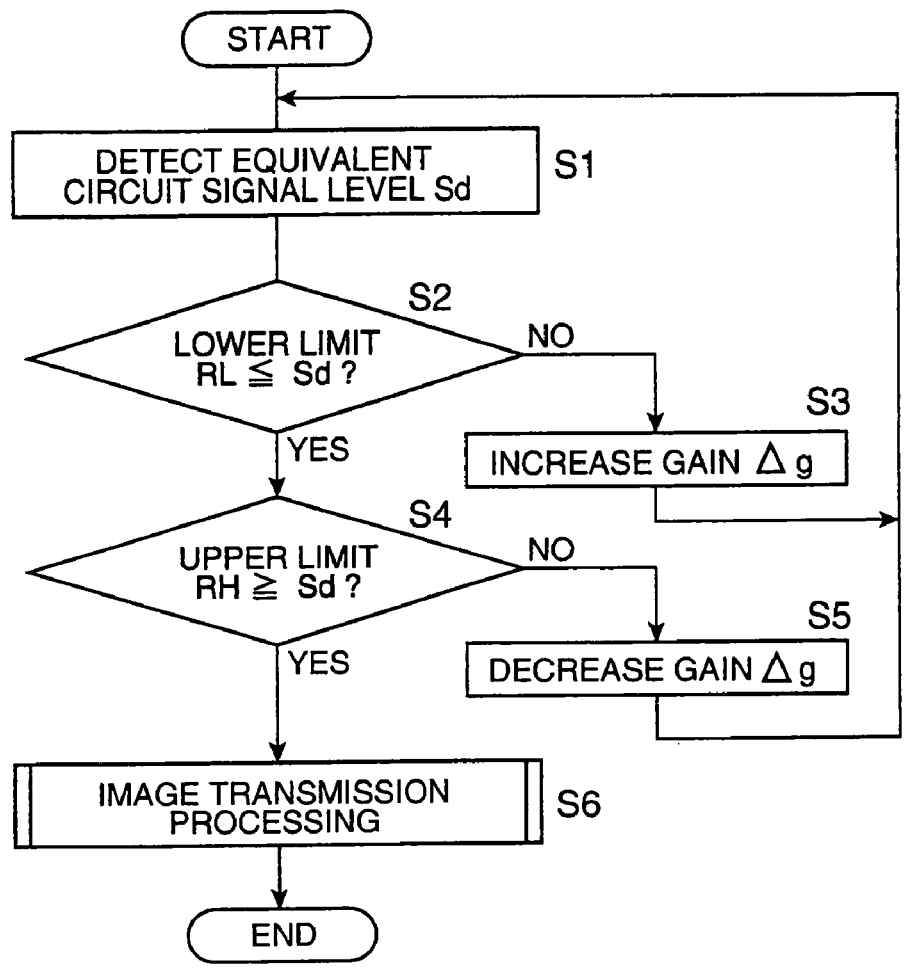
FIG. 8 is a flow chart illustrating the operation of the writing device of the second exemplary embodiment.

An exemplary power transmission adjustment processing will be described with reference to a flowchart of FIG. 8.

When the control unit 20b operates and thus encoded signals are generated by the encoding circuit 205 to be modulated at a certain baseband modulation frequency, so as to be output from the antenna unit 21 as electromagnetic waves, the electromagnetic waves are received by the antenna unit 11 of the electronic paper display device 1 while being received by the antenna unit 24 for monitoring with the similar field intensity. The received encoded signals are rectified by the rectifying circuit 231 to be turned to a direct current by the smoothing circuit 232 so as to be stored in the capacitor Cr that is a power storage. Then, the signals are converted to a voltage by the power supply circuit 233 so as to be consumed at the equivalent load circuit 234. That is, the power consumed by the equivalent load circuit 234 corresponds to the power consumed at the electronic paper display device 1 that is at a position with an adequate distance, i.e., to the power extracted by the power extraction unit 101 of the device and supplied.

The CPU 201 detects the equivalent circuit signal level Sd that indicates the relative value of the power (S1), and then checks whether or not the field intensity at the electronic paper display device 1 is within an adequate range. If the signal level is smaller than the lower limit RL of the range in which adequate operation of the electronic paper display device is ensured (S2: NO), the transmitted power is regarded as small. Thus, the CPU 201 outputs to the encoding circuit 205 a gain control signal Cg to increase the amplitude of transmitted power by a certain amount $\Delta g$ (S3). Increasing the gain is repeated until the signal level Sd detected in the processing reaches within an adequate range (S1-S2: NO-S3).

In contrast, if the equivalent circuit signal level Sd is larger than the upper limit RH of the range in which adequate operation is ensured (S4: NO), the transmitted power is regarded as too large. In this case, the CPU 201 outputs to the encoding circuit 205 the gain control signal Cg to decrease the amplitude of transmitted power by a certain amount $\Delta g$ (S5). Decreasing the gain is repeated until the signal level Sd detected in the processing reaches within an adequate range (S1-S4: NO-S5).

The above-described processing allows the gain of transmitted power to reach within an adequate range, and therefore the CPU 201 continues image transmission processing (S6).

As described above, the second exemplary embodiment achieves the same operation and advantages as those of the first exemplary embodiment. In addition, the writing device 2b monitors electromagnetic waves transmitted by the device 2b itself with the same condition as that in the electronic paper display device 1, and adjusts the output of electromagnetic waves in accordance with the signal level. Therefore, it is possible to adjust and supply electromagnetic waves that induce power having necessary and sufficient intensity that is not too large and is adequate to normally operate the electronic paper display device 1.

A third exemplary embodiment of the invention relates to a modification of an information source of image information.

Figure 9:
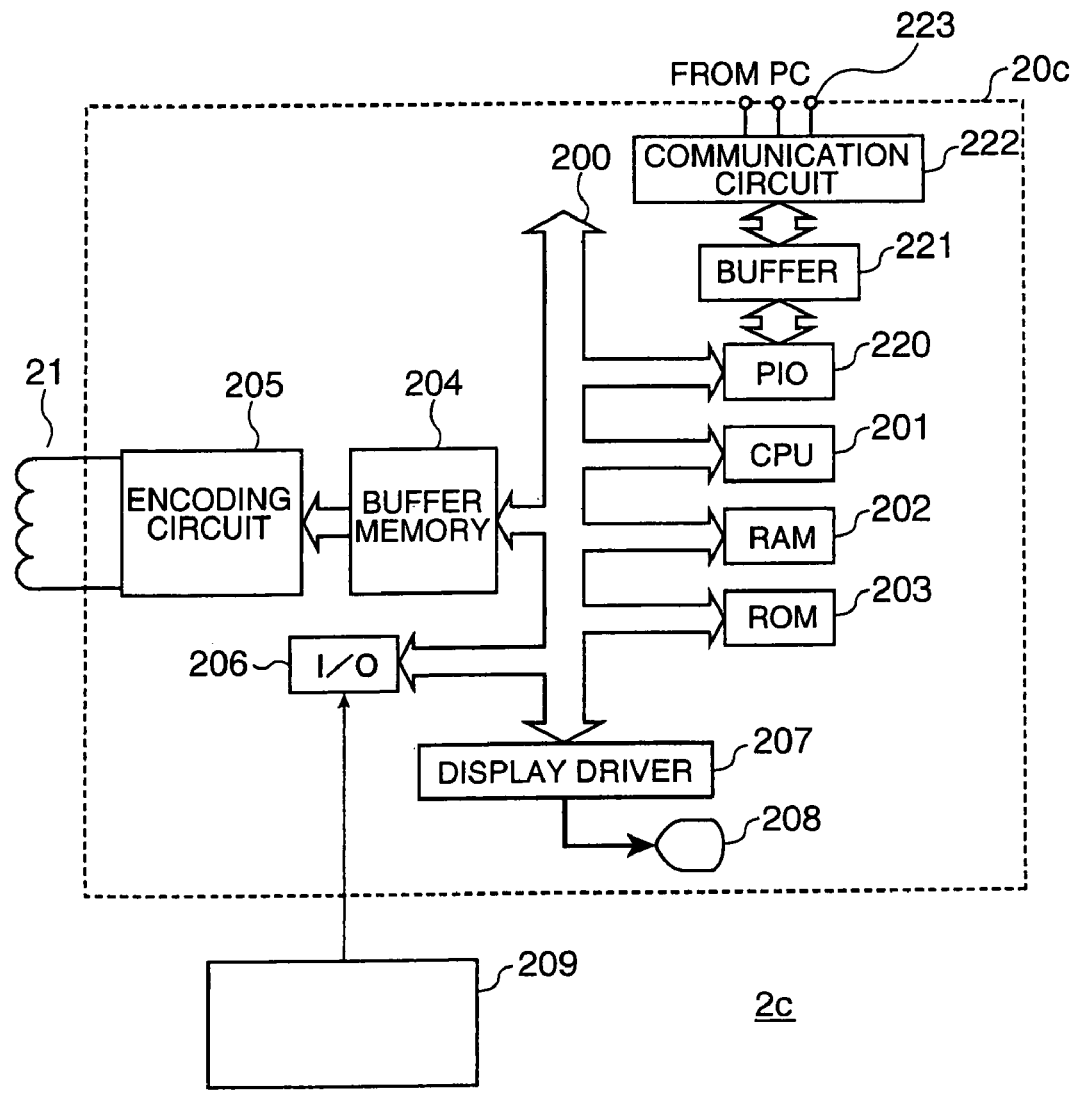
FIG. 9 is a block diagram of a writing device of a third exemplary embodiment.

FIG. 9 is a schematic block diagram of an writing device 2c of the third exemplary embodiment. As shown in FIG. 9, the writing device 2c includes a connector 223 for connecting an external computer device to the writing device via a cable, and a communication circuit 222 that transmits and receives image information to and from the computer devices over communication based on a certain standard via the cable. The writing device 2c also includes a buffering circuit 221 for compensating the difference of communication speed between the external computer device and a control unit 20c, and an interface circuit 220 that sequentially transmits to an internal bus 200 image information stored in the buffering circuit 221. Other configurations are the same as those of the first exemplary embodiment. A publicly known communication standard such as RS-232C, RS-422, Centronics or USB can be used for data communication from the external computer device. Alternatively, with a wireless communication adaptor being coupled to the connector 223, communication over wireless LAN employing radio transmission or the Bluetooth standard may also be available.

According to the above-described configuration, image information can be transmitted any time from the external computer device to be transferred to the electronic paper display device 1 so as to be displayed as images. From a viewpoint of the external computer device, images can be drawn on the electronic paper display device 1 as images are printed on a paper medium by a printer. The CPU 201 operates to switch either display based on operation signals from the input device 209 like the first embodiment or display based on image information from an external computer device, by operation of the input device 209 or printing control from the external computer device, for example.

As described above, according to the third exemplary embodiment, either image information transmitted from the external or image information corresponding to operation signals input from the input device can be drawn. Therefore, image information supplied from the external computer device can directly be encoded and transferred so as to be displayed, and images of characters input from the input device 209 can also be displayed, leading to a wider application range.

A fourth exemplary embodiment of the invention relates to a method for manufacturing an electronic paper display device.

FIGS. 10A to 10F are sectional views illustrating manufacturing steps of an electronic paper display device of the present embodiment. These sectional views of manufacturing steps are schematic diagrams illustrating magnified sections of two pixel parts.

Figure 10A:
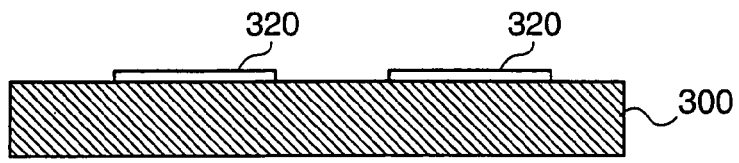
FIGS. 10A to 10F are sectional views for illustrating steps of a method for manufacturing an electronic paper display device according to a fourth exemplary embodiment.

As shown in FIG. 10A, the individual electrodes 320, which are one electrode of the non-volatile display unit 14, are formed on the substrate 300. A material excellent in portability as an electronic paper is used for the substrate 300 (100). It is preferable that, for example, polyethylene terephthalate (PET) is used as a flexible and lightweight material. In the case of using a PET substrate, the PET substrate is preferably exposed to vapor of OST in vacuum or a low pressure atmosphere. Alternatively, a glass substrate may be used. In the case of using a glass substrate, borosilicate glass or the like is used.

Figure 10B:
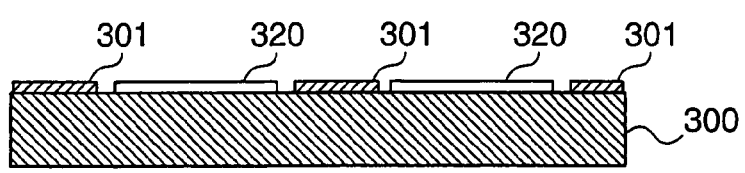

Then, as shown in FIG. 10B, on the substrate 300 transferred are circuit parts 301 including a thin film semiconductor device formed on another substrate. First, the circuit parts 301 are formed on another substrate. A separation layer in which separation or ablation is caused under certain conditions is formed on the substrate by using, for example, amorphous silicon, and then the circuit parts 301 are formed on the separation layer. For example, the separation layer is formed on a thermal resistance substrate such as a glass substrate, and then the semiconductor film 310 is formed on the separation layer. The semiconductor film 310 is obtained by, for example, depositing pentacene by vacuum thermal deposition with a certain substrate temperature and deposition rate. Deposition with a lower substrate temperature and lower deposition rate can provide a semiconductor film having higher mobility. A silicon oxide film is deposited on the semiconductor film by a publicly known method (for example, vapor deposition and photolithography) to form the gate insulating film 313. Then, nickel or the like is deposited by ion-beam sputtering and photolithography to form the gate electrode 315. Subsequently, a silicon oxide film such as a TEOS film is deposited to form the interlayer insulating film 316. Then, by forming through holes and forming and patterning the electrode layer 318, the thin film transistors T and the circuit parts 301 configured by electrically coupling the thin film transistors T are formed.

After forming the circuit parts 301, the circuit parts 301 are adhered to the relevant positions on the substrate 300 with resin or the like, for example, and then the separation layer is irradiated with laser to cause ablation in the separation layer, transferring the circuit parts 301 on the substrate 300.

Figure 10C:
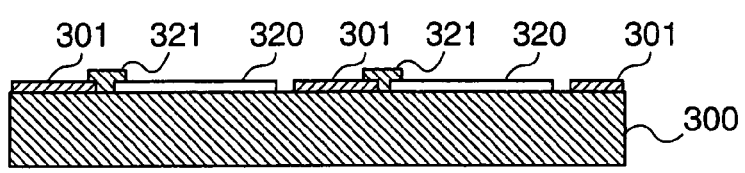

As shown in FIG. 10C, after the circuit parts 301 have been transferred, an output electrode of each thin film transistor T is coupled to one electrode of the non-volatile display unit. For example, the drain electrode of the thin film transistor T is coupled to the individual electrode 320 via the wiring layer 321.

Figure 10D:
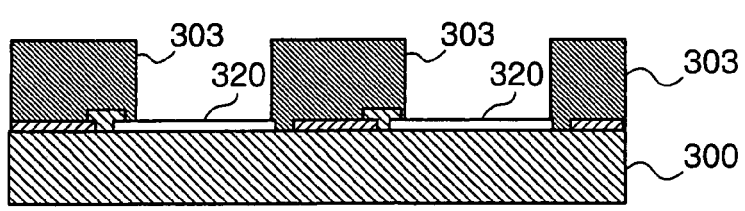

Then, as shown in FIG. 10D, partitions are formed on the substrate in a manner in which electrodes are exposed. Specifically, the resin layers 303 are formed to expose the individual electrodes 320. The resin layers 303 are formed by coating resin in a frame shape on the peripheries of the individual electrodes.

Figure 10E:
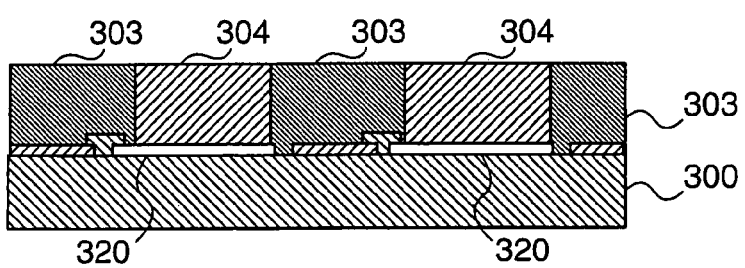

Subsequently, as shown in FIG. 10E, spaces between the partitions (resin layers 303) formed on the substrate are filled with an electrophoretic dispersion liquid. Specifically, openings of the resin layers 303 are filled with an electrophoretic dispersion liquid including electrophoretic particles 319 in a dispersion medium to form the electrophoretic dispersion liquid layers 304.

Figure 10F:
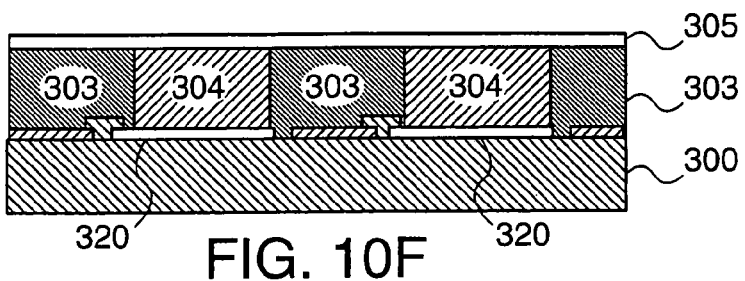

Then, as shown in FIG. 10F, a common electrode is formed to cover the partitions and electrophoretic dispersion liquid layers. Specifically, ITO, which is a transparent electrode material, is deposited uniformly by sputtering or the like to form the common electrode 305. Subsequently, a PET film or the like is deposited as the protective film 306.

In the electronic paper display device fabricated through the above-described steps, if the electrophoretic dispersion liquid layer with a thickness of about 30-50 μm is formed for example, the total thickness of the electronic paper can be about 0.1-0.2 mm. Thus, since the thickness is almost equal to that of a paper, the electronic paper can be used with the feeling of using a paper. In addition, the electronic paper display device of the invention needs no power supply device, and thus the weight thereof can extremely be reduced, resulting in excellent portability.

According to the manufacturing steps of the fourth exemplary embodiment, a thin film semiconductor device fabricated on another substrate is transferred so as to be utilized as a drive unit for a non-volatile display unit. Therefore, even if a final substrate is not durable against process temperature during semiconductor device fabrication, the electronic paper display device 1 including the thin film transistor T having high mobility can be formed. Thus, the electronic paper display device can be formed on a plastic substrate having flexibility, for example.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A writing device that transmits an electromagnetic wave to a receiving device, the writing device comprising:

a first antenna unit;
an equivalent load receiving unit; and
a control unit; and
a second antenna unit,
the first antenna unit receiving the electromagnetic wave transmitted from the second antenna unit,
the equivalent load receiving unit outputting a first signal, the first signal relating a first power of the electromagnetic wave, the first power relating a second power of electromagnetic wave that is received by the receiving device,
the control unit controlling a third power of the electromagnetic wave to be transmitted from the second antenna unit based on the first signal.

2. The writing device according to claim 1, the equivalent load receiving unit further including:
a power supply circuit generating a power based on the electromagnetic wave received by the first antenna unit;
an equivalent load circuit receiving the power from the power supply circuit and consuming the power, the equivalent load circuit having an equivalent load that is corresponding to the receiving device; and
a detector configured to detect a power value corresponding to the equivalent load circuit and output a signal.

3. The writing device according to claim 2, the control unit comprising a CPU configured to receive the signal from the detector.

4. The writing device according to claim 3, the CPU being an asynchronous circuit.

5. The writing device according to claim 4, the control unit further comprising:
a RAM; and
a buffer memory.

6. The writing device according to claim 3, the control unit further comprising a ROM configured to enable the CPU to implement a power transmission adjustment.

7. The writing device according to claim 2, the control unit further comprising:
a CPU configured to receive the signal from the detector and implement a power transmission adjustment;
an encoding circuit configured to generate the second signal according to the power transmission adjustment by the CPU.

8. The writing device according to claim 2, the control unit including:
a CPU configured to receive the signal from the detector implement a power transmission adjustment, the second antenna unit configured to transmit the electromagnetic wave according to the power transmission adjustment by the CPU.

9. The writing device according to claim 1, the equivalent load receiving unit further including:
a rectifying circuit configured to rectify the first signal output from the first antenna unit; and
a smoothing circuit configured to (1) receive the rectified signal from the rectifying circuit, (2) turn the rectified signal to a direct current, and (3) output the direct current to the power supply circuit.

10. The writing device according to claim 1, the second antenna unit being wound in a loop a plurality of times.

11. The writing device according to claim 10, the second antenna unit being configured to transmit a power by mutual induction.

12. A display system comprising:
the writing device according to claim 11; and
a display device receiving the electromagnetic wave from the writing device.

13. A writing device for transmitting an electromagnetic wave to a receiving device, the writing device comprising:
an equivalent load receiving unit configured to compare a target value of the receiving device with an actual electromagnetic wave value of the electromagnetic wave transmitted from a second antenna unit in order to adjust the actual electromagnetic wave value of the electromagnetic wave, the equivalent load receiving unit including:
a first antenna unit configured to receive the electromagnetic wave transmitted from the second antenna unit by mutual induction; and
a control unit configured to adjust the actual electromagnetic wave value of the electromagnetic wave and transmit the electromagnetic wave by mutual induction, the control unit including:
the second antenna unit configured to transmit the electromagnetic wave.

14. The writing device according to claim 13, the equivalent load receiving unit further including:
a CPU configured to detect a power produced on the basis of the electromagnetic wave and implement a power transmission adjustment, the second antenna unit being configured to transmit the electromagnetic wave adjusted by the power transmission adjustment.

15. A display device, comprising:
the writing device according to claim 13; and
a display device receiving the electromagnetic wave from the writing device.

\* \* \* \* \*